July 1, 1958     C. M. GEIGER     2,840,905
SEPARABLE SHEARS

Filed May 29, 1957     3 Sheets-Sheet 1

*INVENTOR*
CHRISTOPHER MARTIN GEIGER

BY

*ATTORNEY*

July 1, 1958     C. M. GEIGER     2,840,905
SEPARABLE SHEARS

Filed May 29, 1957     3 Sheets-Sheet 2

INVENTOR
CHRISTOPHER MARTIN GEIGER

BY *M. V. Gould*

ATTORNEY

July 1, 1958

C. M. GEIGER 2,840,905

SEPARABLE SHEARS

Filed May 29, 1957

INVENTOR
CHRISTOPHER MARTIN GEIGER

BY *mw.Gould*

ATTORNEY

United States Patent Office 2,840,905
Patented July 1, 1958

---

2,840,905

SEPARABLE SHEARS

Christopher Martin Geiger, Quarryville, Pa.

Application May 29, 1957, Serial No. 662,514

4 Claims. (Cl. 30—226)

This invention relates to a pair of separable cutting shears which may be temporarily joined to produce a single cutting unit.

In the cutting of sheet metal it is customary to use right-hand shears and left-hand shears to facilitate the cutting of curves in either direction.

The present invention is directed to a pair of right-hand shears and a pair of left-hand shears, one adapted to be partially nested within the other to provide a single tool and one which may be carried as a single tool and quickly and easily separated to make both a right-hand and a left-hand pair of shears without danger of being confused as to which is the right-hand pair and which is the left-hand pair.

It is a further object of the invention to provide pairs of separable shears which may be quickly and easily detached, the one from the other, for use as separate cutting shears and which may when in nested position be used as a single cutting element.

It is a further object of the present invention to provide pairs of shears, including a right-hand pair and a left-hand pair, which may be nested together to form a single cutting element, a single handle portion serving to operate both pair of shears.

The invention is illustrated in the accompanying drawings in which.

Figure 4:
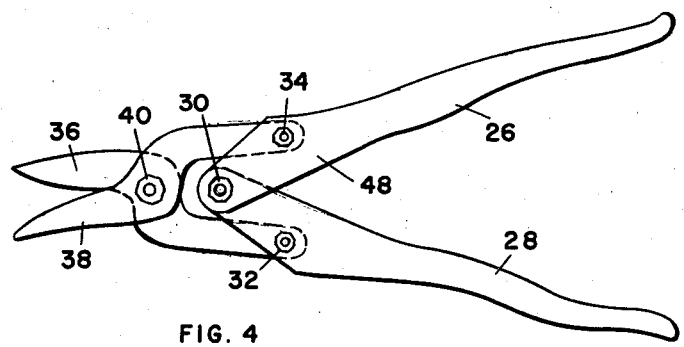
Figure 4 is a side elevation of the right-hand pair of shears.
Figure 3:
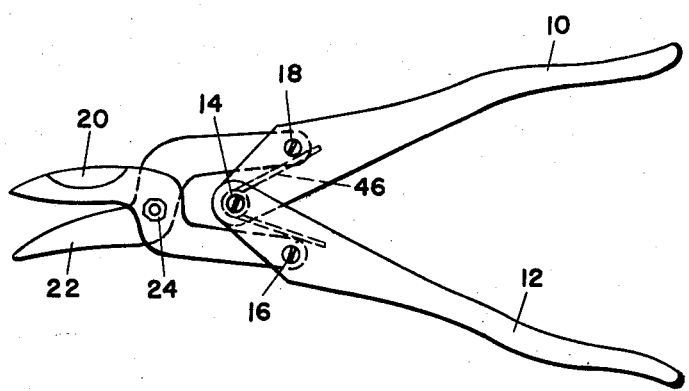
Figure 3 is a side elevation of the left-hand pair of shears.

Referring particularly to Figures 3 and 4, a pair of left-handed shears is shown having handles 10 and 12 pivotally mounted at 14 and carrying pivot pins 16 and 18. A pair of crossed blades 20 and 22 pivoted together at 24 have their ends supported by pivot pins 16 and 18 respectively.

Figure 4 shows a pair of right-hand shears having handles 26 and 28 pivoted together at 30 and supporting pivot pins 32 and 34. Crossed blades 36 and 38 pivotally held together at 40 are carried respectively by the pins 32 and 34.

Figure 1:
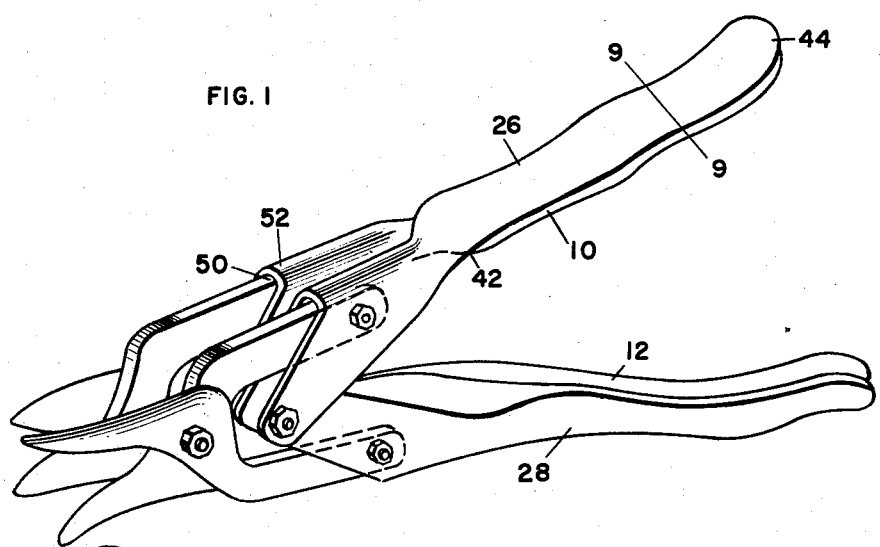
Figure 1 is a perspective view of the pairs of shears in nested position.
Figure 9:
Figure 9 is a cross section on line 9—9 of Figure 1.

The handle members 10, 12, 26 and 28 are formed as shown in Figure 9 with the handles of the right-hand pair of shears being slightly larger and adapted to receive the handles of the left-hand pair of shears, as shown in Figure 1, the configuration of handle 10 being such as to nest securely within handle 26 and from the point 42 (Figure 1) to the end 44 of the handle. In a like manner the handle 12 of the left-hand pair of shears is nested in handle 28 of the right-hand pair of shears. Springs 46 and 48 of the left-hand and right-hand shears respectively force the handles until the side 50 of the blade comes in contact with the overlapping handle portion at 52. The right-hand pair of shears is so adjusted as to open to a slightly less extent than the left-hand pair of shears so that the spring 46 of the left-hand pair of shears holds the shears securely nested within the right-hand pair of shears.

Figure 2:
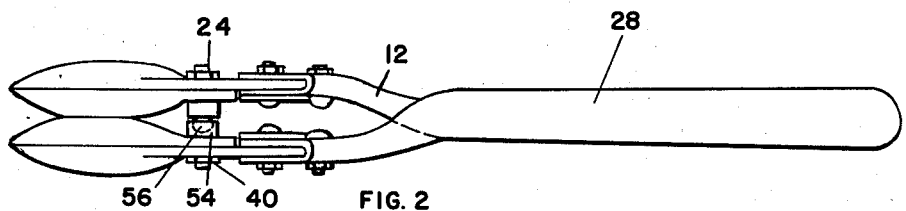
Figure 2 is a top plan view of the same pair of shears.
Figure 8:
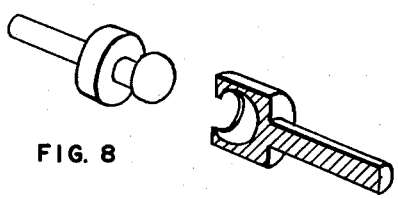
Figure 8 is a detail of the swivel pin connection.

Referring particularly to Figures 2 and 8, the pivot pins 24 and 40 may be formed on their inner side with a snap fitting having a socket 54 receiving a ball 56. The ball and socket 56 is of the usual snap pin separate fastener construction which permits rotation between the ball 56 and the socket 54 and yet prevents accidental dislodgement of the two and holds the pins 40 and 24 in alignment, the one with the other.

Figure 10:
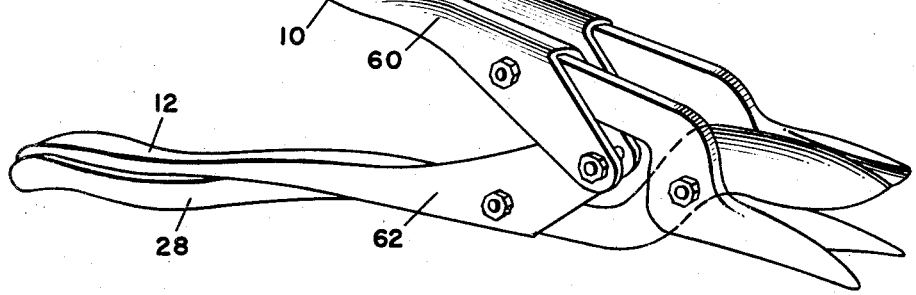
Figure 10 is a perspective view of the shears opposite to that shown in Figure 1.

In using the shears they may be used as a single member as shown in Figure 1, both shears being operated by the hand gripping the handles 26 and 28 of the right-hand pair of shears, the cutting action of the shears leaving a strip of waste material at the center of the cut. This strip of waste material permits clean and even cutting at both of the outside edges, while the inner edge or waste material will be slightly deformed. This is particularly advantageous in cutting curves or in cutting around the circumference of a pipe. The left-hand shears is quickly and easily detachable from the right-hand shears by grasping the left-hand shears and exerting pressure at points (Figure 10) 60 and 62 which moves the handles of the left-hand pair of shears inward and free of the handles of the right-hand pair of shears.

Figure 5:
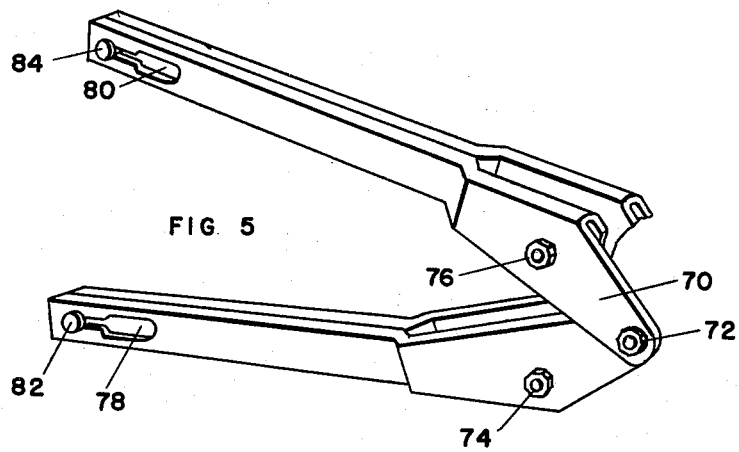
Figure 5 is a perspective view of the handle portion of two pairs of shears showing a modified form of construction.
Figure 6:
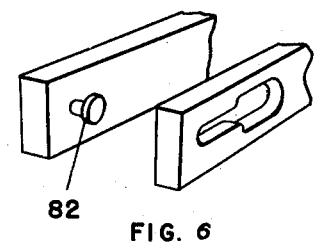
Figure 6 is a detail of the handle latching of the shears shown in Figure 5.

A modification of the handles is shown in Figure 5 in which the handles instead of being curved to fit the hand and hollow are of straight rectangular in cross section formation and show a right-hand pair of shears 70 pivoted at 72 and carrying pivot pins 74 and 76 which support blades, not shown, but similar to those shown in Figures 4 and 5. The handle members of the right-hand pair of shears are formed with bayonet slots 78 and 80, while those of the left-hand pair of shears are provided with pins 82 and 84. A longitudinal motion of the left-hand pair of shears locks the pins 82 and 84 respectively in the narrow parts of the bayonet slots 78 and 80 to secure the handles together so that they may be operated by a single hand and in unison one with the other.

Figure 7:
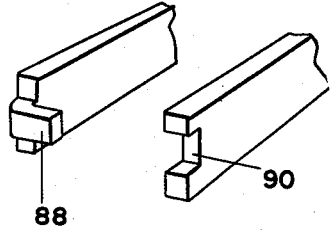
Figure 7 is a form of a modification of a second latching means.

A further modified form of securing the handles together is shown in Figure 7 in which a tongue portion 88 on one of the handles fits into a notch 90 on the other handle to hold them together.

The shears thus formed can be used as a single unit or may be nested for the convenience of carrying and used as separate individual shears.

What is claimed is:

1. A right-hand pair of shears, a left-hand pair of shears, the handles of said shears being similar, the handle of the right-hand shears receiving and nesting the handle of the left-hand shears to provide a single cutting instrument capable of manual operation with a single handle.

2. Pairs of shears separably connected to form a single cutter, the handles of one pair of shears being receivable and nested within the handles of the other pair of shears.

3. A pair of separable cutters comprising right-hand cutters having open hollow handles, left-hand cutters having handles adapted to be received and nested within the handles of said right-hand cutters whereby said cutters may be used as a single cutting tool, cutting with both right and left-hand cutters simultaneously.

4. A pair of separable cutting shears, comprising shears adapted to be separately manipulated by the right hand and shears adapted to be separately manipulated by the left hand, the handle of the left-hand shears being nested within the handle of the right-hand shears to permit manipulation with either hand of both pairs of shears in a simultaneous cutting operation.

References Cited in the file of this patent

UNITED STATES PATENTS 596,213     Loewenthal _____ Dec. 28, 1897

FOREIGN PATENTS 11,441     Great Britain _____ of 1884